C. R. PERRY & C. M. FINCH.
FILTER.
APPLICATION FILED OCT. 19, 1908.
924,497.
Patented June 8, 1909.
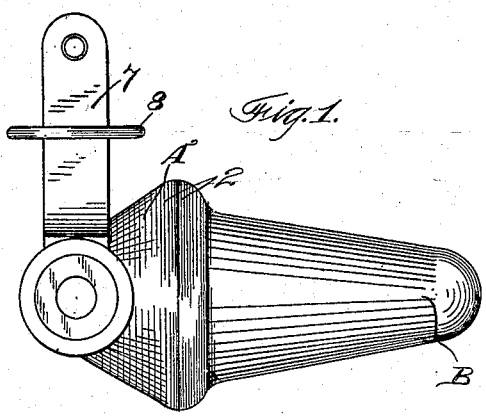
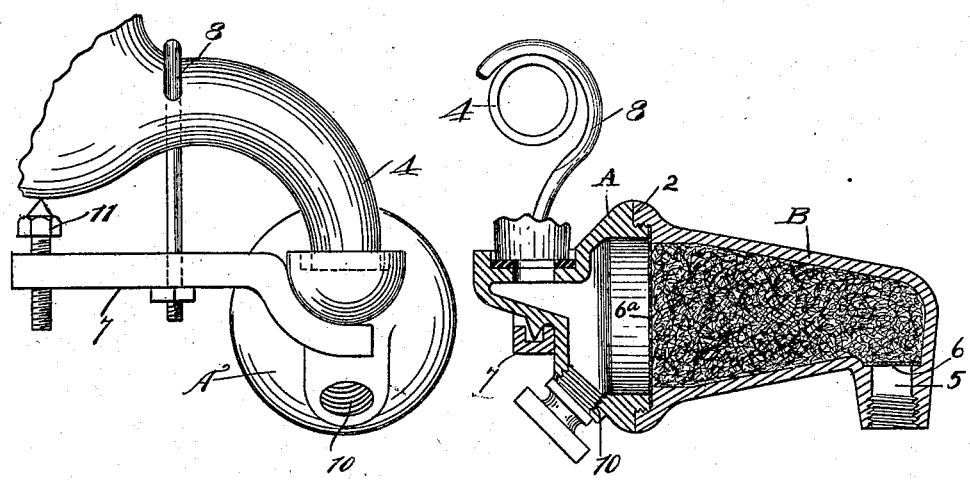
WITNESSES
F. E. Maynard.
C. A. Penfield
INVENTORS
Cortez R. Perry and
Charles M. Finch;
BY
Geo. H. Strong
their ATTORNEY

UNITED STATES PATENT OFFICE.

CORTEZ R. PERRY AND CHARLES M. FINCH, OF SAN FRANCISCO, CALIFORNIA; SAID PERRY ASSIGNOR TO SAID FINCH.

FILTER.

No. 924,497.     Specification of Letters Patent.     Patented June 8, 1909.

Application filed October 19, 1908. Serial No. 458,406.

*To all whom it may concern:*

Be it known that we, CORTEZ R. PERRY and CHARLES M. FINCH, citizens of the United States, residing in the city and county of San Francisco and State of California, have invented new and useful Improvements in Filters, of which the following is a specification.

Our invention relates to filters, and it consists in a combination of parts, and in details of construction, which will be more fully explained by reference to the accompanying drawings, in which—

Figure 1 is a plan. Fig. 2 is a rear elevation. Fig. 3 is a longitudinal section.

Our present invention is designed to provide a filter which may present a sufficient filtering area, without occupying too great a depth; such filters being especially suitable for use where there is but little space between the faucet discharge and the sink or receptacle below.

Our faucet consists of a casing made in two parts A and B; these parts may have flanges 2, and means by which the flanges may be secured together, or they may be threaded and screwed together, so that the two parts of the casing lie in a substantially horizontal position, and have comparatively little vertical depth.

At the inner end and upper side of the shorter of the casings, is an opening designed to receive the down-turned nozzle of a faucet 4.

At the opposite end, and lower side of the longer section of the casing, is a discharge opening 5. This discharge opening is covered by a screen 6, suitably fixed therein, and at the point where the two members of the casing unite, a screen 6ᵃ is fixed, being preferably clamped between the flanges. Within this larger or longer portion of the casing is a filling of suitable filtering material through which all the liquid received into the first and shorter member of the casing is caused to flow before being discharged.

From the side of the casing A extends a bracket 7 which projects at right angles with the longer axis of the filtering apparatus.

8 is a hook or staple, the end of which is screw-threaded to screw into the bracket 7, or to receive a nut.

The faucet 4 which projects horizontally through the wall above the sink, has its down-turned end adapted to enter the opening in the upper part of the short receiving portion of the filter, and the hook or staple fitting over the top of the faucet barrel, the filter may be clamped immovably to the faucet. This enables us to use the filter with faucets of any description whether they may have plain or screw-threaded discharge ends, and the joint may be made between the discharge and the filter by any suitable gasket. The position of the filter is also such that its greatest length is substantially parallel with the wall through which the faucet projects, and the filter is thus maintained at a position but a little way from the wall, and substantially clear from the sink or receptacle below; while by reason of its horizontal position, it enables us to provide a comparatively large filter surface without too great a depth to the filter.

In Fig. 2 we have shown a bolt 11 having a screw-threaded shank turnable in a threaded hole in the bracket 7, and by this device the filter may be adjusted to faucets having nozzles of different lengths.

10 is an opening in the open first section of the filter normally closed by a plug, which also fits the discharge opening 5. By transferring the plug to the discharge and opening the faucet, the screen and filter will be effectually cleansed and purified.

Having thus described our invention, what we claim and desire to secure by Letters Patent is—

1. A filter composed of a plurality of horizontal casings having contiguous uniting flanges, and an interposed screen, a discharge, screen-protected opening at the outer end, a receiving opening at top of the opposite end, and a clamp by which the filter is secured directly to a faucet, said clamp including a bracket extending at right-angles with the casings having its free end to hook over the faucet.

2. In a filter, the combination with a faucet having a down-turned nozzle, of a filter casing disposed horizontally at right-angles with the major axis of the faucet and comprising two axially-alined chambers, a screen dividing said chambers, a filtering material in one of said chambers, and a separate clamp having one part to engage the one of said casing and having another part to detachably embrace the faucet barrel.

3. In a filter, a horizontally disposed casing, with contained screens and filter material, a receiving opening at the top of one end, a discharge opening at the lower part of the opposite end, a bracket extending at right angles with the casing, and substantially in line with the receiving opening, a faucet connected with said receiving opening, a hook or yoke fitting over the faucet barrel, and means to adjustably connect the yoke and bracket.

In testimony whereof we have hereunto set our hands in presence of two subscribing witnesses.

CORTEZ R. PERRY.
CHAS. M. FINCH.

Witnesses:
M. D. Brown,
W. D. Bell.